United States Patent
Sanghavi et al.

(10) Patent No.: US 10,455,449 B1
(45) Date of Patent: Oct. 22, 2019

(54) ACHIEVING SYMMETRIC DATA PATH STEERING ACROSS A SERVICE DEVICE

(71) Applicant: Juniper Networks, Inc., Sunnyvale, CA (US)

(72) Inventors: Dilip H. Sanghavi, Cupertino, CA (US); Rakesh Kumar, San Ramon, CA (US); Saravanadas P. Subramanian, San Jose, CA (US); Jwala Dinesh Gupta Chakka, Sunnyvale, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 140 days.

(21) Appl. No.: 14/865,605

(22) Filed: Sep. 25, 2015

(51) Int. Cl.
*H04W 28/08* (2009.01)
*H04L 29/06* (2006.01)
*H04W 12/06* (2009.01)
*H04W 76/11* (2018.01)

(52) U.S. Cl.
CPC .......... *H04W 28/08* (2013.01); *H04L 65/102* (2013.01); *H04W 12/06* (2013.01); *H04W 76/11* (2018.02)

(58) Field of Classification Search
CPC ... H04W 28/08; H04W 65/102; H04W 12/06; H04W 76/021; H04W 67/1002; H04W 63/08; H04W 63/0892
See application file for complete search history.

(56) References Cited

U.S. PATENT DOCUMENTS

| | | | | |
|---|---|---|---|---|
| 9,509,600 | B1* | 11/2016 | Szabo | .................. H04L 41/0896 |
| 2007/0130457 | A1* | 6/2007 | Kamat | ................. H04L 63/0281 |
| | | | | 713/151 |
| 2007/0258465 | A1* | 11/2007 | Ma | ......................... H04W 28/08 |
| | | | | 370/395.53 |
| 2011/0016509 | A1* | 1/2011 | Huang | .................. H04L 63/062 |
| | | | | 726/1 |
| 2011/0069714 | A1* | 3/2011 | Le Pennec | .............. H04L 45/00 |
| | | | | 370/401 |
| 2016/0261486 | A1* | 9/2016 | Fang | ....................... H04L 45/04 |

OTHER PUBLICATIONS

RFC2865 Remote Authentication Dial in User Service (RADIUS) Jun. 2000.*

(Continued)

*Primary Examiner* — Jeffrey M Rutkowski
*Assistant Examiner* — Basil Ma
(74) *Attorney, Agent, or Firm* — Harrity & Harrity, LLP

(57) ABSTRACT

A device may perform dynamic load balancing to identify one or more service devices, of a group of service devices, that is to apply a set of network services to traffic associated with a session of a subscriber device. The device may provide outgoing traffic, associated with the session, to the one or more service devices based on identifying the one or more service devices. The outgoing traffic may be provided to cause the one or more service devices to apply the set of network services to the outgoing traffic. The device may provide, to another device, information that identifies the one or more service devices. The information that identifies the one or more service devices may be provided to cause the other device to provide incoming traffic, associated with the session, to the one or more service devices to apply the set of network services to the incoming traffic.

20 Claims, 7 Drawing Sheets

(56) References Cited

OTHER PUBLICATIONS

Juniper Networks, "The NFV Service Edge: Networks that know how to customize the user experience for each and every subscriber", Juniper Networks, Inc., Solution Brief, 3510520-001-EN, Sep. 2014, 4 pages.

Juniper Networks, "Enabling Solutions in Cloud Infrastructure and for Network Functions Virtualization: Gateway Use Cases for Contrail Virtual Networks with MX Series Routers", Juniper Networks, Inc., White Paper, 2000594-001-EN, Feb. 2015, 16 pages.

* cited by examiner

ACHIEVING SYMMETRIC DATA PATH STEERING ACROSS A SERVICE DEVICE

BACKGROUND

A service device (sometimes referred to as a service complex) may include one or more devices configured to apply one or more network services to traffic received from and/or destined for a subscriber device, such as a firewall service, a parental control service, a packet inspection service, a content optimization service, a content cache service, a traffic detection service, or the like.

SUMMARY

According to some possible implementations, a method may include: performing, by a gateway device, dynamic load balancing to identify a particular service device, of a plurality of service devices, that is to apply a network service to traffic associated with a session of a subscriber device; providing, by the gateway device, outgoing traffic, associated with the session, to the particular service device based on identifying the particular service device, where the outgoing traffic may be provided to the particular service device for application of the network service to the outgoing traffic; and providing, by the gateway device, information that identifies the particular service device, where the information that identifies the particular service device may be provided to cause another gateway device to provide incoming traffic, associated with the session and received by the other gateway device, to the particular service device for application of the network service to the incoming traffic.

According to some possible implementations, a device may include one or more processors to: perform dynamic load balancing to identify one or more service devices, of a group of service devices, that is to apply a set of network services to traffic associated with a session of a subscriber device; provide outgoing traffic, associated with the session, to the one or more service devices based on identifying the one or more service devices, where the outgoing traffic may be provided to cause the one or more service devices to apply the set of network services to the outgoing traffic; and provide, to another device, information that identifies the one or more service devices, where the information that identifies the one or more service devices may be provided to cause the other device to provide incoming traffic, associated with the session, to the one or more service devices to apply the set of network services to the incoming traffic.

According to some possible implementations, a system may include a first device to: perform dynamic load balancing to identify a service device, of multiple service devices, that is to apply a network service to traffic associated with a session of a subscriber device; provide outgoing traffic, associated with the session, to the service device based on identifying the service device, where the outgoing traffic may being provided to cause the service device to apply the network service to the outgoing traffic; and provide, to a second device, information that identifies the service device to permit the second device to: store the information that identifies the service device, receive incoming traffic associated with the session, and provide, based on the information that identifies the service device, incoming traffic, associated with the session, to the service device for application of the network service to the incoming traffic, where the incoming traffic and the outgoing traffic may be provided to the same service device.

DETAILED DESCRIPTION

Figure 1A:
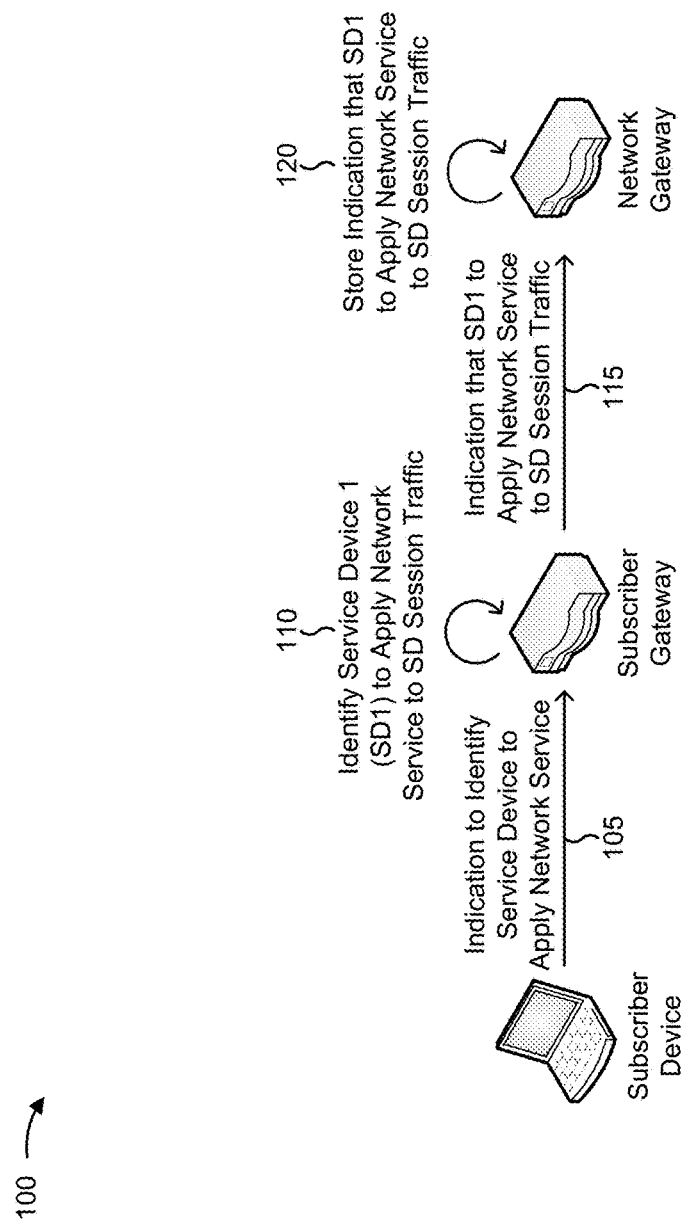
FIGS. 1A-1C are diagrams of an overview of an example implementation described herein.

The following detailed description of example implementations refers to the accompanying drawings. The same reference numbers in different drawings may identify the same or similar elements.

One or more service devices may be positioned between a subscriber gateway (e.g., a gateway between a group of subscriber devices and the one or more service devices) and a network gateway (e.g., a gateway between a network and the one or more service devices). In such a case, load balancing may be needed on both the subscriber gateway and the network gateway in order to manage traffic, associated with the group of subscriber devices, among the one or more service devices (e.g., such that a traffic load is distributed among the one or more services devices).

However, the subscriber gateway and the network gateway may need to manage the traffic such that traffic provided by a particular subscriber device during a session (i.e., outgoing traffic travelling in a forward direction from the particular subscriber device toward a network) travels via a same service device as traffic to be provided to the particular subscriber device (i.e., incoming traffic travelling in a reverse direction from the network to the particular subscriber device). In other words, the subscriber gateway and the network gateway may need to ensure that outgoing traffic and incoming traffic, associated with the particular subscriber device during a session, travels via a same service device (e.g., through a same set of server devices, through a same set of virtual machines, etc.).

Such symmetry may be achieved, for example, by statically configuring the subscriber gateway and the network gateway (e.g., using routing prefixes) to steer traffic to the same service device. However, such a static solution may not result in a desirable load distribution when, for example, a first service device is processing traffic associated with multiple subscriber devices, while a second service device is not processing any traffic. An alternative solution includes dynamically load balancing traffic among the service devices. However, such a solution creates a challenge since the network gateway may not be aware of the dynamic load balancing decision made by the subscriber gateway during establishment of the session. In other words, it may be difficult to ensure that the network gateway provides incoming traffic, associated with a subscriber device session, to a same service device as the network gateway provides outgoing traffic associated with the subscriber device session (e.g., in order to ensure a symmetric traffic flow for the session).

Implementations described herein may enable symmetric traffic flow, associated with a subscriber device and during a session, across a service device, positioned between a subscriber gateway and a network gateway, identified by performing dynamic load balancing. This may be achieved by propagating, from the subscriber gateway to the network gateway, information that identifies the service device to which traffic, associated with the subscriber device, is to be provided during the session.

Figure 1B:
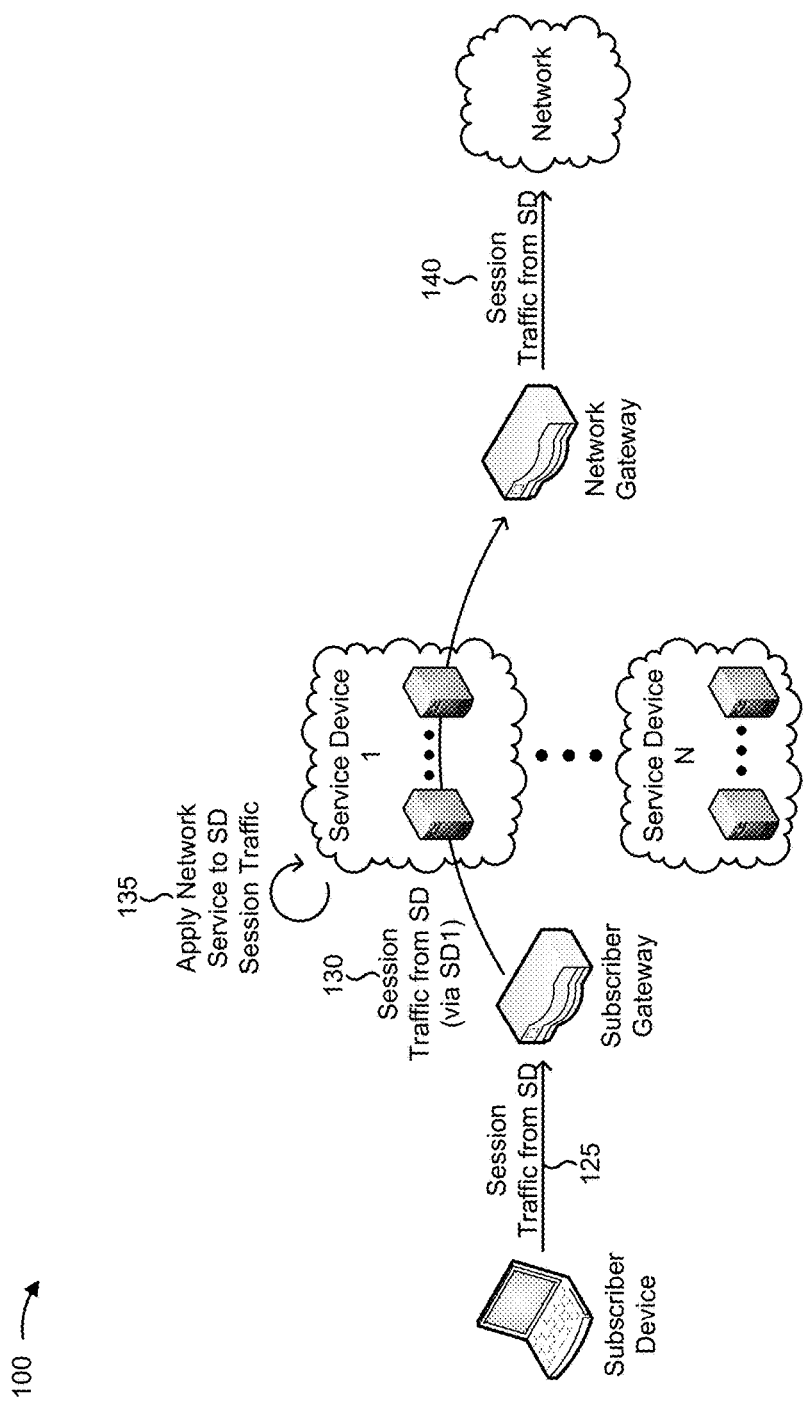
Figure 1C:
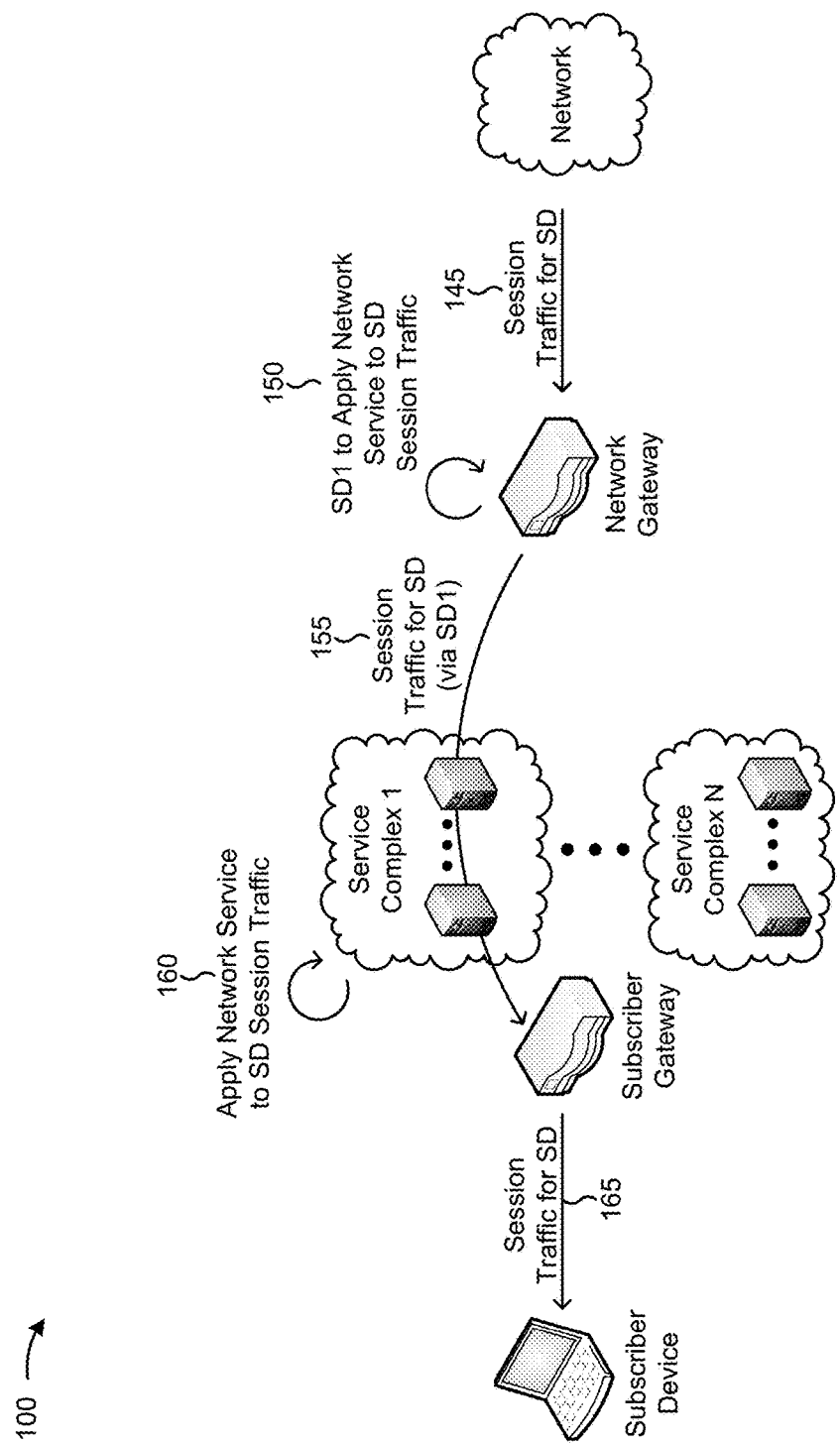

FIGS. 1A-1C are diagrams of an overview of an example implementation 100 described herein. For the purposes of example implementation 100, assume that a subscriber device, included in a local network (e.g., a virtual private network, an enterprise network, a machine-to-machine network, etc.), receives an indication to communicate with one or more devices included in a network (e.g., the Internet). Further, assume that one or more network services are to be applied to traffic associated with sessions of the subscriber device by one or more service devices that are positioned between the subscriber device and the network. Finally, assume that a subscriber gateway and a network gateway are positioned between the subscriber device and the network in order to route traffic for application of the network services by the one or more service devices.

As shown in FIG. 1A, and by reference number 105, the subscriber device may provide, to the subscriber gateway, an indication to identify a service device that is to apply a network service to traffic associated with a session of the subscriber device. For example, the indication may be in the form of a message associated with establishing a session that allows the subscriber device to communicate via the network.

As shown by reference number 110, the subscriber gateway may receive the indication, and may identify (e.g., based on information that identifies the subscriber device, based on information that identifies the local network in which the subscriber device is included, etc.) a service device that is to apply the network service to traffic associated with the session of the subscriber device. For example, the subscriber gateway may determine a network service that is to be applied to traffic associated with the session of the subscriber device, may identify one or more service devices configured to apply the network service, and, based on performing dynamic load balancing, select a particular service device to apply the network service to traffic associated with the session of the subscriber device.

As shown in FIG. 1A, assume that, based on performing dynamic load balancing, the subscriber gateway identifies a particular service device (e.g., SD1) that is to apply the network service to traffic associated with the session of the subscriber device (e.g., during the subscriber device session). As shown by reference number 115, after identifying the particular service device, the subscriber gateway may provide, to the network gateway, an indication that the particular service device is to apply the network service to traffic associated with the session of the subscriber device. As shown by reference number 120, the network gateway may receive the indication, and may store information indicating that the particular service device is to apply the network service to traffic associated with the session of the subscriber device.

For the purposes of FIG. 1B, assume that the session has been established that allows the subscriber device to communicate via the network (e.g., via the subscriber gateway and the network gateway). As shown by reference number 125, the subscriber device may provide, to the subscriber gateway, traffic destined for the network (i.e., outgoing traffic). As shown by reference number 130, the subscriber gateway may provide the outgoing traffic to the identified particular service device. As shown by reference number 135, the particular service device may apply the network service to the outgoing traffic and may forward the outgoing traffic, after applying the network service, to the network gateway. As shown by reference number 140, the network gateway may then provide the outgoing traffic to the network.

As shown in FIG. 1C, and by reference number 145, the network gateway may receive (e.g., via the network and associated with the session) traffic destined for the subscriber device (i.e., incoming traffic). As shown by reference number 150, the network gateway may determine, based on the information that identifies the particular service device (e.g., received from the subscriber gateway, as described above), that the network gateway is to provide the incoming traffic to the particular service device for application of the network service. As shown by reference number 155, the network gateway may provide the incoming traffic to the particular service device (i.e., the same service device that applied the network service to the outgoing traffic). As shown by reference number 160, the particular service device may apply the network service to the incoming traffic, and may forward the incoming traffic, after applying the network service, to the subscriber gateway. As shown by reference number 165, the subscriber gateway may then provide the incoming traffic to the subscriber device.

In this way, a symmetric traffic flow, associated with a subscriber device, may be achieved such that a same service device, positioned between a subscriber gateway and a network gateway, applies a network service to all traffic associated with a particular session of the subscriber device. This permits dynamic load balancing to be performed when identifying the service device, thereby improving load distribution among a group of service devices associated with providing network services.

Figure 2:
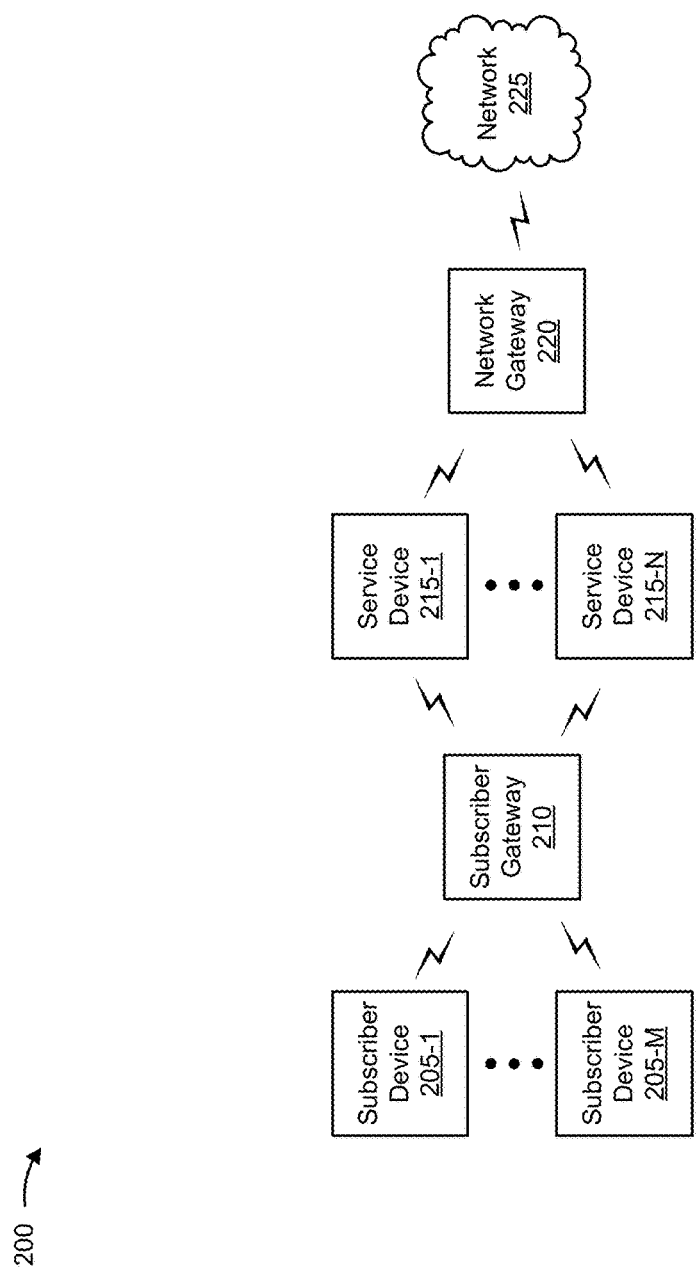
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include one or more subscriber devices 205-1 through 205-M (M≥1) (hereinafter referred to collectively as subscriber devices 205, and individually as subscriber device 205), a subscriber gateway 210, two or more service devices 215-1 through 215-N (N≥1) (hereinafter referred to collectively as service devices 215, and individually as service device 215), a network gateway 220, and a network 225. Devices of environment 200 may interconnect via wired connections, wireless connections, or a combination of wired and wireless connections.

Subscriber device 205 may include one or more devices capable of communicating with other devices via network 225. For example, subscriber device 205 may include a computing device, such as a laptop computer, a tablet computer, a handheld computer, a desktop computer, a mobile phone (e.g., a smart phone, a radiotelephone, etc.), or a similar device. In some implementations, one or more subscriber devices 205 may be included in a local network, associated with accessing network 225 via one or more service devices 215, such as a virtual private network, an enterprise network, a machine-to-machine network, or the like (e.g., such that one or more network services may be applied, by the one or more services devices 215, to traffic associated with the local network).

Subscriber gateway 210 may include a device, positioned between subscriber device 205 and service devices 215, that is capable of receiving, transmitting, processing, and/or routing traffic received from and/or to be provided to service devices 215. For example, subscriber gateway 210 may include a gateway, a router, a switch, a server, a modem, a NIC, a hub, a bridge, a OADM, or another type of traffic transfer device. In some implementations, subscriber gateway 210 may include a service control gateway associated with forwarding traffic, received from subscriber device 205, to one or more service devices 215 and/or forwarding traffic, destined for subscriber device 205, received from one or more service devices 215. Additionally, or alternatively, subscriber gateway 210 may be capable of generating, providing, and/or interpreting messages associated with providing Authentication, Authorization, and Accounting (AAA) management services, such as Remote Authentication Dial-In User Service (RADIUS) messages. In some implementations, subscriber gateway 210 may be capable of performing dynamic load balancing associated with service devices 215.

Service device 215 may include one or more devices configured to apply one or more network services to traffic provided by and/or destined for subscriber device 205. For example, service device 215 may include one or more server devices, gateways, routers, switches, firewalls, devices of a cloud computing environment, or the like, that are configured to apply one or more network services to subscriber device 205 traffic. In some implementations, service device 215 may host one or more virtual machines associated with applying one or more network services to traffic of subscriber device 205.

Network gateway 220 may include a device, positioned between service devices 215 and network 225, that is capable of receiving, transmitting, processing, and/or routing traffic received from and/or to be provided to service devices 215. For example, network gateway 220 may include a gateway, a router, a switch, a server, a modem, a NIC, a hub, a bridge, a OADM, or another type of traffic transfer device. In some implementations, network gateway 220 may include a service control gateway associated with forwarding traffic, received from network 225, to one or more service devices 215 and/or forwarding traffic, destined for network 225, received from one or more service devices 215. Additionally, or alternatively, network gateway 220 may be capable of generating, providing, and/or interpreting messages associated with providing AAA management services, such as RADIUS messages.

Network 225 may include one or more wired and/or wireless networks that allow subscriber devices 205 to communicate. For example, network 225 may include a local area network ("LAN"), a wide area network ("WAN"), a metropolitan area network ("MAN"), a telephone network (e.g., the Public Switched Telephone Network ("PSTN")), an ad hoc network, an intranet, the Internet, a fiber optic-based network, a private network, a cloud computing network, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3A:
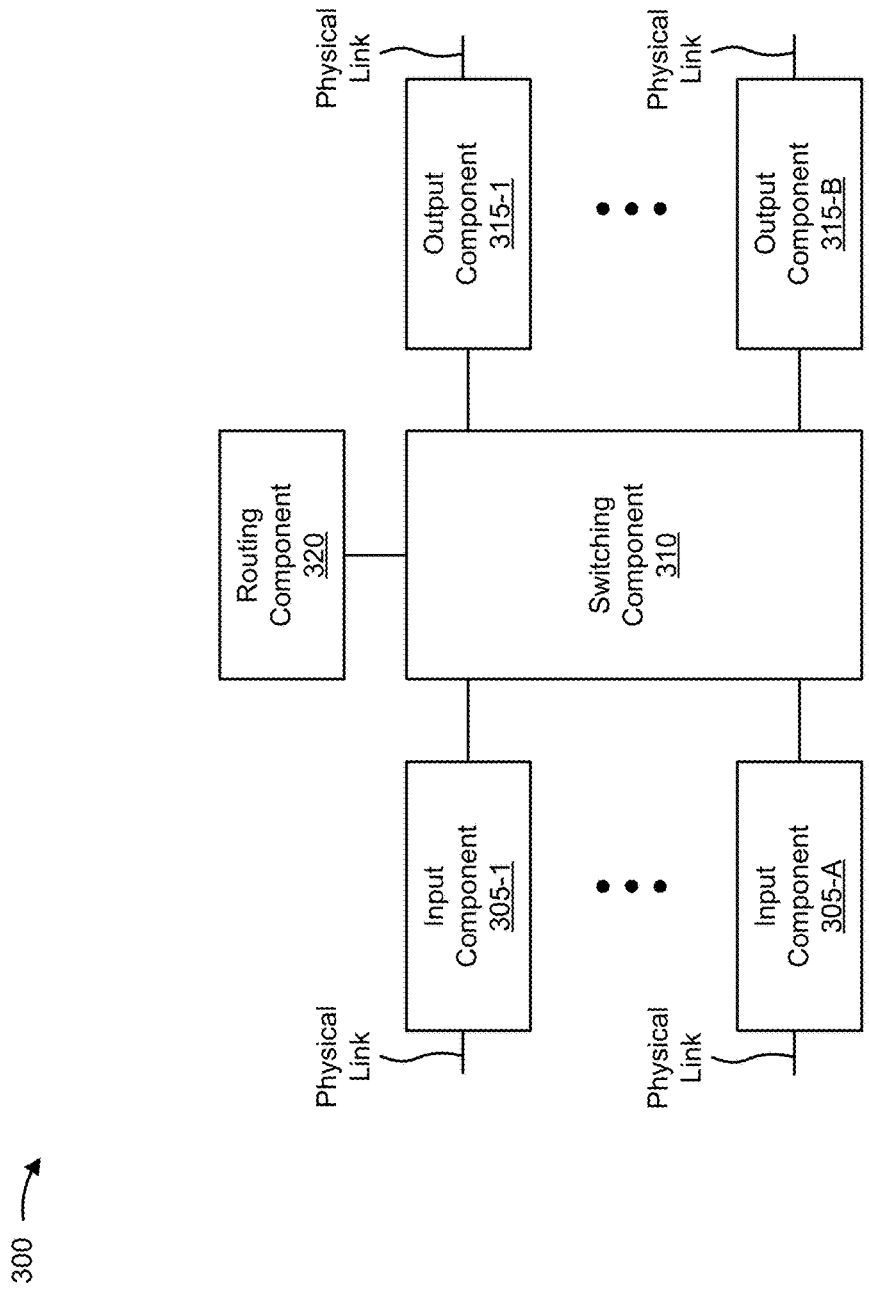
FIGS. 3A and 3B are diagrams of example components of one or more devices of FIG. 2.

FIG. 3A is a diagram of example components of a device 300. Device 300 may correspond to subscriber gateway 210 and/or network gateway 220. In some implementations, subscriber gateway 210 and/or network gateway 220 may include one or more devices 300 and/or one or more components of device 300. As shown in FIG. 3A, device 300 may include one or more input components 305-1 through 305-A (A≥1) (hereinafter referred to collectively as input components 305, and individually as input component 305), a switching component 310, one or more output components 315-1 through 315-B (B≥1) (hereinafter referred to collectively as output components 315, and individually as output component 315), and a routing component 320.

Input component 305 may include points of attachment for physical links and may be points of entry for traffic, such as packets. Input component 305 may process received traffic, such as by performing data link layer encapsulation or decapsulation. In some implementations, input component 305 may send packets to output component 315 via switching component 310.

Switching component 310 may interconnect input components 305 with output components 315. Switching component 310 may be implemented using one or more of multiple, different techniques. For example, switching component 310 may be implemented via busses, via crossbars, and/or with shared memories. The shared memories may act as temporary buffers to store traffic from input components 305 before the traffic is eventually scheduled for delivery to output components 315. In some implementations, switching component 310 may enable input components 305, output components 315, and/or routing component 320 to communicate.

Output component 315 may include points of attachment for physical links and may be points of exit for traffic, such as packets. Output component 315 may store packets and may schedule packets for transmission on output physical links. Output component 315 may include scheduling algorithms that support priorities and guarantees. Output component 315 may support data link layer encapsulation or decapsulation, and/or a variety of higher-level protocols. In some implementations, output component 315 may send packets and/or receive packets.

Routing component 320 may include one or more processors, microprocessors, field-programmable gate arrays (FPGAs), application-specific integrated circuit (ASICs), or similar types of processing components. In some implementations, routing component 320 may communicate with other devices, networks, and/or systems connected to device 300 to exchange information regarding network topology. Routing component 320 may create routing tables based on the network topology information, create forwarding tables based on the routing tables, and forward the forwarding tables to input components 305 and/or output components 315. Input components 305 and/or output components 315 may use the forwarding tables to perform route lookups for incoming packets.

The number and arrangement of components shown in FIG. 3A are provided as an example. In practice, device 300 may include additional components, fewer components, different components, or differently arranged components than those shown in FIG. 3A. Additionally, or alternatively, a set of components (e.g., one or more components) of device 300 may perform one or more functions described as being performed by another set of components of device 300.

Figure 3B:
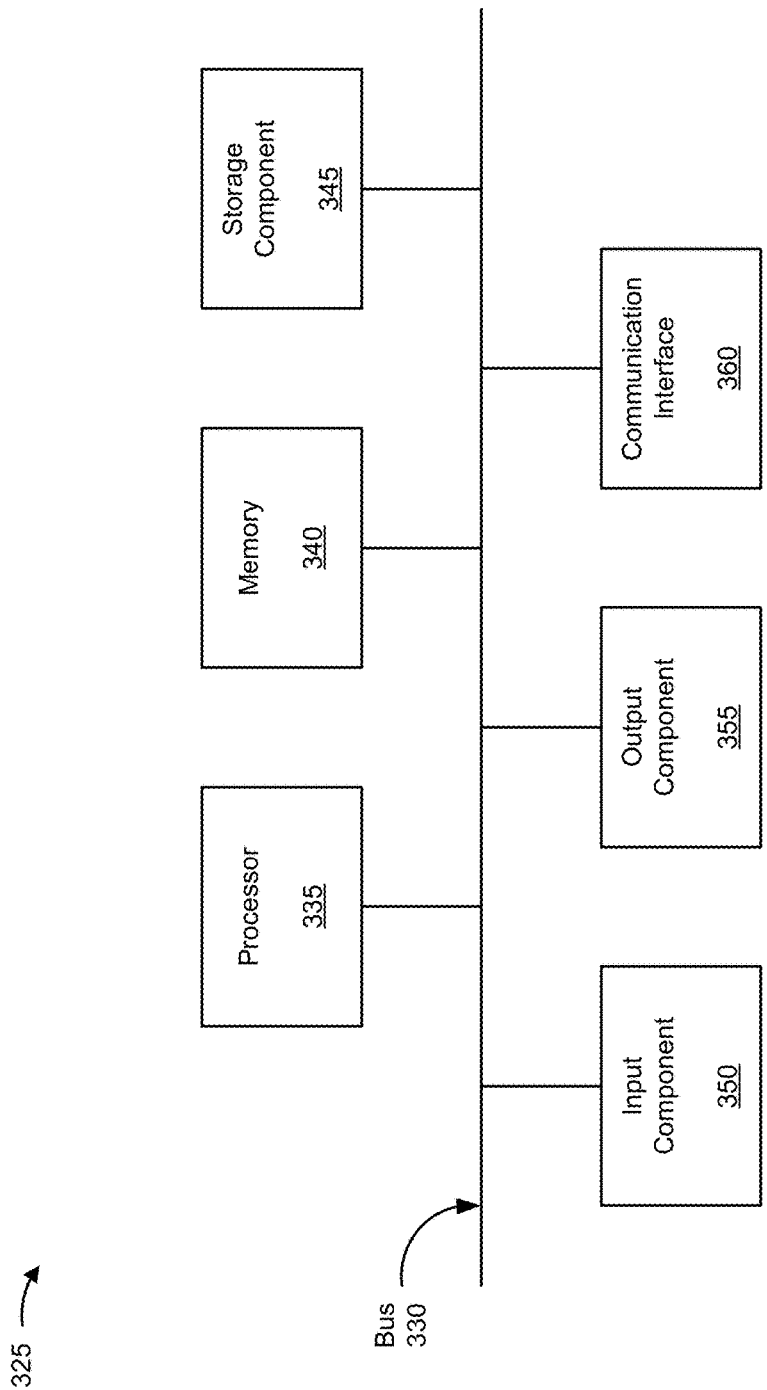

FIG. 3B is a diagram of example components of a device 325. Device 325 may correspond to subscriber device 205 and/or service device 215. In some implementations, subscriber device 205 and/or service device 215 may include one or more devices 325 and/or one or more components of device 325. As shown in FIG. 3B, device 325 may include a bus 330, a processor 335, a memory 340, a storage component 345, an input component 350, an output component 355, and a communication interface 360.

Bus 330 may include a component that permits communication among the components of device 325. Processor 335 is implemented in hardware, firmware, or a combination of hardware and software. Processor 335 may include a processor (e.g., a central processing unit (CPU), a graphics processing unit (GPU), an accelerated processing unit (APU), etc.), a microprocessor, and/or any processing component (e.g., an FPGA, an ASIC, etc.) that interprets and/or executes instructions. In some implementations, processor 335 may include one or more processors that are programmed to perform a function. Memory 340 may include a random access memory (RAM), a read only memory (ROM), and/or another type of dynamic or static storage device (e.g., a flash memory, a magnetic memory, an optical memory, etc.) that stores information and/or instructions for use by processor 335.

Storage component 345 may store information and/or software related to the operation and use of device 325. For example, storage component 345 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 325 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 355 may include a component that provides output information from device 325 (e.g., a display, a speaker, one or more light-emitting diodes (LEDs), etc.).

Communication interface 360 may include a transceiver-like component (e.g., a transceiver, a separate receiver and transmitter, etc.) that enables device 325 to communicate with other devices, such as via a wired connection, a wireless connection, or a combination of wired and wireless connections. Communication interface 360 may permit device 325 to receive information from another device and/or provide information to another device. For example, communication interface 360 may include an Ethernet interface, an optical interface, a coaxial interface, an infrared interface, a radio frequency (RF) interface, a universal serial bus (USB) interface, a Wi-Fi interface, a cellular network interface, or the like.

Device 325 may perform one or more processes described herein. Device 325 may perform these processes in response to processor 335 executing software instructions stored by a computer-readable medium, such as memory 340 and/or storage component 345. A computer-readable medium is defined herein as a non-transitory memory device. A memory device includes memory space within a single physical storage device or memory space spread across multiple physical storage devices.

Software instructions may be read into memory 340 and/or storage component 345 from another computer-readable medium or from another device via communication interface 360. When executed, software instructions stored in memory 340 and/or storage component 345 may cause processor 335 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3B are provided as examples. In practice, device 325 may include additional components, fewer components, different components, or differently arranged components than those shown in FIG. 3B. Additionally, or alternatively, a set of components (e.g., one or more components) of device 325 may perform one or more functions described as being performed by another set of components of device 325.

Figure 4:
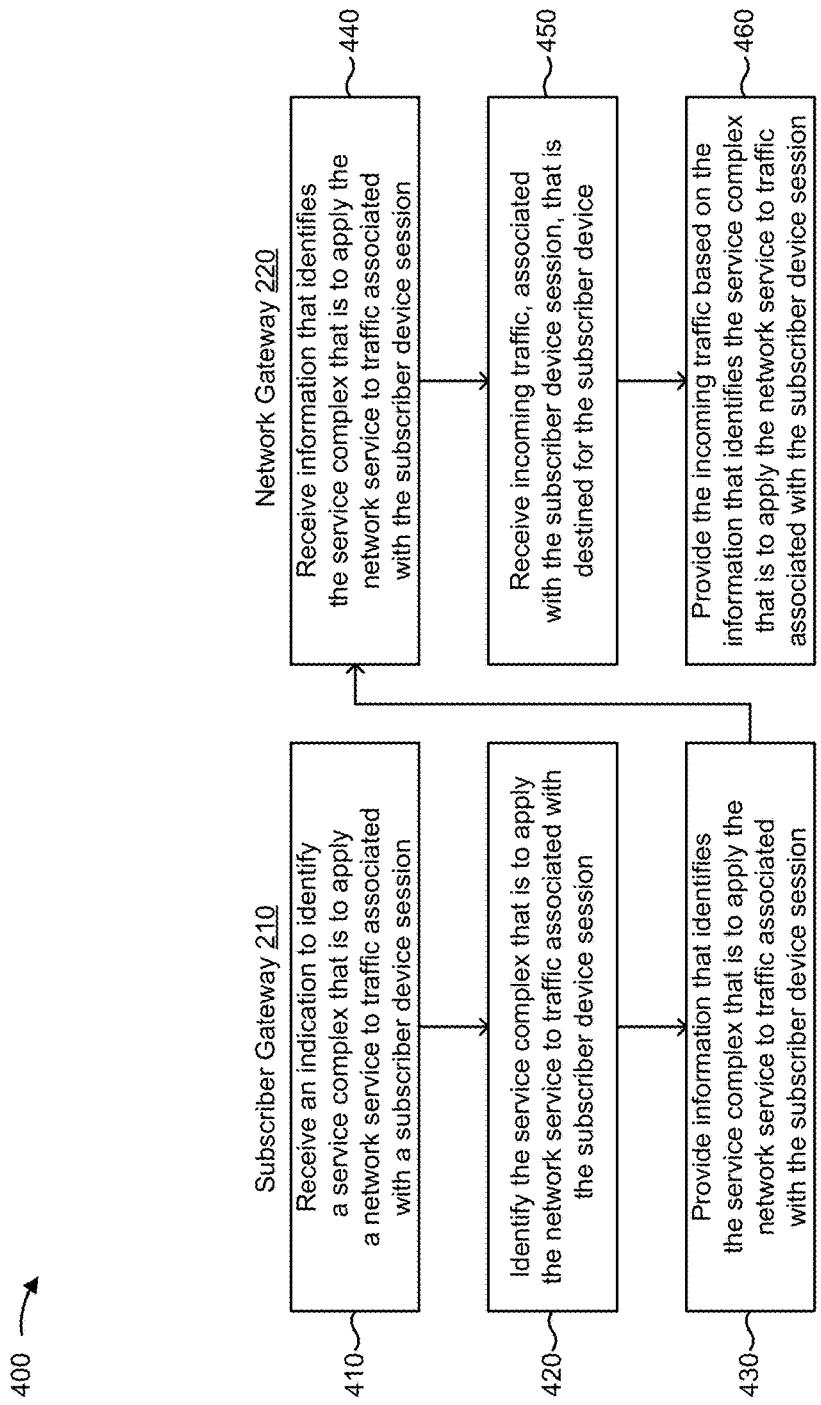
FIG. 4 is a flow chart of an example process for providing traffic, destined for a subscriber device, to a service device that is to apply network service to the traffic.

FIG. 4 is a flow chart of an example process 400 for providing traffic, destined for a subscriber device, to a service device that is to apply network service to the traffic. In some implementations, one or more process blocks of FIG. 4 may be performed by subscriber gateway 210 and/or network gateway 220. In some implementations, one or more process blocks of FIG. 4 may be performed by another device or a group of devices separate from or including subscriber gateway 210 and/or network gateway 220, such as another device of environment 200.

As shown in FIG. 4, process 400 may include receiving an indication to identify a service device that is to apply a network service to traffic associated with a subscriber device session (block 410). For example, subscriber gateway 210 may receive an indication to identify a service device 215, from a group of multiple service devices 215, that is to apply a network service to traffic associated with a session of subscriber device 205 (herein referred to as a subscriber device session). In some implementations, subscriber gateway 210 may receive the indication from another device, such as subscriber device 205.

In some implementations, subscriber gateway 210 may receive the indication based on receiving a message associated with AAA management during establishment of the session associated with subscriber device 205, such as a RADIUS message. For example, subscriber device 205 may provide, to subscriber gateway 210, a RADIUS message (e.g., an access request message, an accounting request message, etc.) as part of an attachment process for establishing the session that allows subscriber device 205 to communicate via network 225. Here, subscriber gateway 210 may receive the RADIUS message and may treat the RADIUS message as the indication to identify a service device 215 that is apply the network service to traffic, associated with subscriber device 205, during the session.

As described above, in some implementations, the network service may include a firewall service, a parental control service, a packet inspection service, a content optimization service, a content cache service, a traffic detection service, or the like. In some implementations, one or more network services may be applied to traffic associated with the subscriber device session by service device 215 (e.g., by one or more server devices of service device 215, by one or more virtual machines of one or more service devices 215, etc.).

As further shown in FIG. 4, process 400 may include identifying the service device that is to apply the network service to traffic associated with the subscriber device session (block 420). For example, subscriber gateway 210 may identify service device 215 that is to apply the network service to traffic associated with the subscriber device session. In some implementations, subscriber gateway 210 may identify service device 215 that is to apply the network service to session traffic, associated with subscriber device 205, after subscriber gateway 210 receives the indication to identify service device 215.

In some implementations, subscriber gateway 210 may identify service device 215 based on information associated with subscriber device 205. For example, subscriber gateway 210 may receive, during establishment of the session, information that identifies subscriber device 205 (e.g., an Internet protocol (IP) address, a device identification number, a device name, etc.), information that identifies a local network in which subscriber device 205 is included (e.g., a VPN identifier (VPN ID), an enterprise network identifier, a machine-to-machine network identifier, etc.), information that identifies a user of subscriber device 205 (e.g., a username, a user identifier, etc.), or the like. Here, subscriber gateway 210 may determine, based on the information associated with subscriber device 205, one or more network services that are to be applied to traffic during the session. As an example, a policy and charging rules component of subscriber gateway 210 may identify, based on an IP address that identifies subscriber device 205, a VPN ID of a VPN in which subscriber device 205 is located, and/or a username of a user of subscriber device 205, one or more network services (sometimes referred to as a service chain) that are to be applied to traffic associated with subscriber device session, traffic associated with a VPN in which subscriber device 205 is included, and/or traffic associated with a user of subscriber device 205.

In this example, subscriber gateway 210 may identify, based on the information that identifies the network service, one or more service devices 215 capable of applying the network service to the traffic (e.g., subscriber gateway 210 may identify one or more service devices 215 configured to apply a firewall service, a packet inspection service, etc.). Alternatively, subscriber gateway 210 may identify, based on the information that identifies the network service, one or more virtual routing and forward (VRF) instances that correspond to service devices 215 configured to apply the network service. For example, subscriber gateway 210 may store or have access to a set of VRF instances that indicate routing and/or forwarding addresses for service device 215 at which the network service may be provided, and subscriber gateway 210 may identify the service device 215 accordingly.

Additionally, or alternatively, subscriber gateway 210 may identify service device 215 based on a destination, associated with the session of subscriber device 205, that will provide traffic to subscriber device 205 (e.g., a web address, a uniform resource locator, a server identifier, etc.).

In some implementations, subscriber gateway 210 may identify service device 215 based on performing dynamic load balancing. For example, subscriber gateway 210 may identify multiple service devices 215 capable of applying the network service, and may perform dynamic load balancing to select a particular service device 215 of the multiple service devices 215, such as a service device 215 with a highest amount of available processing resources, a highest amount of available bandwidth, a fewest number of traffic flows being processed, or the like. In some implementations, subscriber gateway 210 may identify one or more service devices 215 configured to apply one or more network services. As such, subscriber gateway 210 may ensure that a first service device 215 is not overloaded with traffic, while also ensuring that a second service device 215 is not under utilized, thereby causing computing resources to be used more efficiently.

As further shown in FIG. 4, process 400 may include providing information that identifies the service device that is to apply the network service to traffic associated with the subscriber device session (block 430). For example, subscriber gateway 210 may provide information that identifies service device 215 that is to apply the network service to traffic associated with the subscriber device session. In some implementations, subscriber gateway 210 may provide the information that identifies service device 215 after subscriber gateway 210 identifies service device 215 that is to apply the network service. Additionally, or alternatively, subscriber gateway 210 may provide the information that identifies the service device 215 after the session, associated with allowing subscriber device 205 to communicate via network 225, is established.

In some implementations, subscriber gateway 210 may provide the information that identifies service device 215 to network gateway 220 that lies between service device 215 and network 225. For example, subscriber gateway 210 may provide the information that identifies service device 215 to network gateway 220 that is positioned on an edge of a service provider network, including service device 215, via which subscriber device 205 may communicate via network 225 (e.g., as illustrated in FIG. 2). The information that identifies service device 215 may include a network address associated with service device 215 (e.g., an IP address), information that identifies a VRF instance corresponding to service device 215, or another type of information that network gateway 220 may use to identify service device 215.

In some implementations, subscriber gateway 210 may provide the information that identifies service device 215 in a message associated with providing AAA management services, such as a RADIUS message. For example, the information that identifies service device 215 may be represented by an attribute-value pair associated with a RADIUS message.

Additionally, or alternatively, the information that identifies service device 215 may be included in subscriber state information associated with subscriber device 205. For example, subscriber gateway 210 may be configured to provide, to network gateway 220, subscriber state information, associated with subscriber device 205, during establishment of a session for subscriber device 205. The subscriber state information may include, for example, information associated with subscriber device 205 (e.g., an IP address, a device identifier, etc.), policy information associated with subscriber device 205, the information that identifies service device 215, or the like. Additionally, or alternatively, subscriber gateway 210 may provide, to network gateway 220, information associated with the session that allows subscriber device 205 to communicate via network 225, such as a session identifier associated with the session of subscriber device 205 that allows subscriber device 205 to communicate via network 225.

In this way, subscriber gateway 210 may dynamically identify service device 215 that is to apply the network service to traffic associated with subscriber device 205, and propagate information that identifies service device 215 to network gateway 220.

As further shown in FIG. 4, process 400 may include receiving information that identifies the service device that is to apply the network service to traffic associated with the subscriber device session (block 440). For example, network gateway 220 may receive information that identifies service device 215 that is to apply the network service to traffic associated with the subscriber device session. In some implementations, network gateway 220 may receive the information that identifies service device 215 after subscriber gateway 210 provides the information that identifies service device 215.

In some implementations, network gateway 220 may receive the information that identifies service device 215 via one or more devices included in a service provider network that includes subscriber gateway 210 and network gateway 220, such as service device 215 and/or one or more other devices.

In some implementations, network gateway 220 may also receive other information associated with the subscriber device session, such as subscriber state information associated with subscriber device 205, a session identifier associated with subscriber device 205, or the like. Here, network gateway 220 may store the information that identifies service device 215 and information that indicates an association between the information that identifies service device 215 and the other information associated with subscriber device 205 (e.g., such that network gateway 220 may determine the information that identifies service device 215 based on information associated with the subscriber device session and/or subscriber device 205, as described below).

As further shown in FIG. 4, process 400 may include receiving incoming traffic, associated with the subscriber device session, that is destined for the subscriber device (block 450). For example, network gateway 220 may receive incoming traffic, associated with the subscriber device session, that is destined for subscriber device 205. In some implementations, network gateway 220 may receive the incoming traffic, associated with the subscriber session, that is destined for subscriber device 205 after network gateway 220 receives the information that identifies service device 215 that is to apply the network service to traffic associated with subscriber device 205.

In some implementations, the incoming traffic may include incoming traffic associated with the session of subscriber device 205. For example, after establishment of the session that allows subscriber device 205 to communicate via network 225, subscriber device 205 may send outgoing traffic to subscriber gateway 210. Here, subscriber gateway 210 may identify (e.g., based on information associated with subscriber device 205, based on the information that identifies service device 215, based on information associated with the session, etc.) service device 215 that is to apply the network service to traffic during the session, and may provide the outgoing traffic to service device 215, accordingly. Service device 215 may apply the network service to the outgoing traffic, and may forward the outgoing traffic, after applying the network service, to network gateway 220. Network gateway 220 may provide the outgoing traffic to a destination within network 225. Network gateway 220 may then receive, via network 225, incoming traffic that is responsive to the outgoing traffic (e.g., a response to a request included in the outgoing traffic) that is to be provided to subscriber device 205. In some implementations, the incoming traffic may not be responsive to outgoing traffic (e.g., a device within network 225 may send a request destined for subscriber device 205).

In some implementations, the incoming traffic may include information that allows network gateway 220 to identify service device 215 that is to apply the network service to the incoming traffic, such as the information that identifies subscriber device 205 (e.g., the IP address, the device identification number, the device name, etc.), the information that identifies a local network in which subscriber device 205 included (e.g., the VPN ID, the enterprise network identifier, the machine-to-machine network identifier, etc.), the information that identifies a user of subscriber device 205, the session identifier associated with the session, or the like.

As further shown in FIG. 4, process 400 may include providing the incoming traffic based on the information that identifies the service device that is to apply the network service to traffic associated with the subscriber device session (block 460). For example, network gateway 220 may provide the incoming traffic based on the information that identifies service device 215 that is to apply the network service to traffic associated with the subscriber device session. In some implementations, network gateway 220 may provide the incoming traffic after network gateway 220 receives the incoming traffic via network 225.

In some implementations, network gateway 220 may provide the incoming traffic based on identifying service device 215 that is to apply the network service to traffic associated with subscriber device 205. For example, network gateway 220 may receive the incoming traffic including the information that identifies subscriber device 205, the information that identifies the local network in which subscriber device 205 included, the information that identifies the user of subscriber device 205, the session identifier associated with the session of subscriber device 205, or the like. Here, network gateway 220 may identify, based on the received information that identifies service device 215 that is to apply the network service and the information included in the incoming traffic, service device 215 that is to apply the network service, and may provide the incoming traffic to this service device 215. In one example, network gateway 220 may receive the incoming traffic, determine the session identifier associated with the subscriber device session, and perform a lookup to identify which service device 215 is to apply the network service to the incoming traffic, and provide the incoming traffic to the identified service device 215. As such, network gateway 220 may provide the incoming traffic such that the incoming traffic is processed by a same service device 215 as outgoing traffic associated with the subscriber device session.

In this way, network gateway 220 may receive the information that identifies service device 215 that is to apply the network service to traffic associated with a session of subscriber device 205, and may provide incoming traffic such that traffic flow, associated with subscriber device 205 during the session, is symmetric.

In some implementations, subscriber gateway 210 and/or network gateway 220 may continue providing traffic, associated with the session of subscriber device 205, via the same service device 215 during the session (e.g., such that all traffic associated with the session passes through the same service device 215). Additionally, or alternatively, subscriber device 205 may have multiple concurrent sessions and traffic for each session may be routed to a respective (e.g., same, different, etc.) service device 215.

In some implementations, after the session of subscriber device 205 ends (e.g., when subscriber device 205 is finished sending and receiving traffic associated with the session), subscriber gateway 210 and/or network gateway 220 may delete their respective session-service device 215 information.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Implementations described herein may enable symmetric traffic flow, associated with a subscriber device and during a session. The symmetric traffic flow may be across a service device, positioned between a subscriber gateway and a network gateway, that is identified by performing dynamic load balancing. This may be achieved by propagating, from the subscriber gateway to the network gateway, information that identifies the service device to which traffic, associated with the subscriber device, is to be provided during the session.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "group" and "set" are intended to include one or more items (e.g., related items, unrelated items, a combination of related items and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   identifying, by a subscriber gateway and based on a virtual private network identifier that identifies a local network in which a subscriber device is included, a network service that is to be applied to traffic associated with a session of the subscriber device;
   performing, by the subscriber gateway, dynamic load balancing to identify a particular service device, of a plurality of service devices, that is to apply the network service;
   providing, by the subscriber gateway, outgoing traffic, associated with the session, to the particular service device based on identifying the particular service device,
      the outgoing traffic being provided to the particular service device for application of the network service to the outgoing traffic, and
      the outgoing traffic flowing from the subscriber gateway via the particular service device to a network gateway that is positioned between the plurality of service devices and a different network; and
   providing, by the subscriber gateway and to the network gateway, particular information that identifies that the particular service device is to apply the network service to traffic associated with the session of the subscriber device,
      the particular information being provided in a remote authentication dial-in user service (RADIUS) message, and
      the particular information being provided to cause the network gateway to provide incoming traffic, associated with the session and received by the network gateway, to the particular service device for application of the network service to the incoming traffic.

2. The method of claim 1, further comprising:
   providing a session identifier associated with the session of the subscriber device,
      the session identifier being provided to allow the network gateway to store an association between the session and the particular service device.

3. The method of claim 1, further comprising:
   identifying, based on the network service to be applied to traffic associated with the session of the subscriber device, a set of service devices configured to apply the network service,
      the set of service devices being included in the plurality of service devices, performing the dynamic load balancing comprising:
         performing the dynamic load balancing, based on identifying the set of service devices, to identify the particular service device, and
      the particular service device being one of the set of service devices configured to apply the network service.

4. The method of claim 1, where the RADIUS message is associated with authentication, authorization, and accounting management services.

5. The method of claim 1, where the particular information is represented by an attribute-value pair included in the RADIUS message.

6. The method of claim 1, where the network service includes at least one of:
   a firewall service,
   a parental control service,
   a packet inspection service,
   a content optimization service,
   a content cache service, or
   a traffic detection service.

7. The method of claim 1, further comprising:
   determining that the session of the subscriber device has ended; and
   deleting session-service device information stored by the subscriber gateway.

8. A subscriber gateway of a local network, the subscriber gateway comprising:
   a memory; and
   one or more processors to:

identify, based on a virtual private network identifier that identifies a local network in which a subscriber device is included, a set of network services that are to be applied to traffic associated with a session of the subscriber device;

perform dynamic load balancing to identify one or more service devices, of a group of service devices, that is to apply the set of network services;

provide outgoing traffic, associated with the session, to the one or more service devices based on identifying the one or more service devices, the outgoing traffic being provided to cause the one or more service devices to apply the set of network services to the outgoing traffic, and the outgoing traffic flowing from the subscriber gateway via the one or more service devices to a network gateway that is positioned between the one or more service devices and a different network; and provide, to the network gateway, particular information that identifies that the one or more service devices are to apply the set of network services to traffic associated with the session of the subscriber device, the particular information being provided in a remote authentication dial-in user service (RADIUS) message, and the particular information being provided to cause the network gateway to provide incoming traffic, associated with the session, to the one or more service devices to apply the set of network services to the incoming traffic.

9. The subscriber gateway of claim 8, where the one or more processors are further to:

provide a session identifier associated with the session of the subscriber device, the session identifier being provided to allow the network gateway to store an association between the session and the one or more service devices.

10. The subscriber gateway of claim 8, where the one or more processors are further to:

identify, based on the set of network services to be applied to traffic associated with the session of the subscriber device, a set of service devices configured to apply the set of network services, the set of service devices being included in the group of service devices, and where, when performing the dynamic load balancing to identify the one or more service devices, the one or more processors are to:

perform the dynamic load balancing, based on identifying the set of service devices, to identify the one or more service devices, the one or more service devices being one or more of the set of service devices configured to apply the set of network services.

11. The subscriber gateway of claim 8, where the RADIUS message is associated with authentication, authorization, and accounting management services.

12. The subscriber gateway of claim 8, where the particular information is represented by an attribute-value pair included in the RADIUS message.

13. The subscriber gateway of claim 8, where the set of network services includes at least one of:

a firewall service,
a parental control service,
a packet inspection service,
a content optimization service,
a content cache service, or
a traffic detection service.

14. The subscriber gateway of claim 8, wherein the one or more processors are further to:

determine that the session of the subscriber device has ended; and delete session-service device information stored on the subscriber gateway.

15. A system, comprising:

a subscriber gateway to:

identify, based on a virtual private network identifier that identifies a local network in which a subscriber device is included, a network service that is to be applied to traffic associated with a session of the subscriber device;

perform dynamic load balancing to identify a service device, of multiple service devices, that is to apply the network service;

provide outgoing traffic, associated with the session, to the service device based on identifying the service device, the outgoing traffic being provided to cause the service device to apply the network service to the outgoing traffic, and the outgoing traffic flowing from the subscriber gateway via the service device to a network gateway that is positioned between the multiple service devices and a different network; and provide, to the network gateway and in a remote authentication dial-in user service (RADIUS) message, particular information that identifies that the service device is to apply the network service to traffic associated with the session of the subscriber device to permit the network gateway to:

store information that identifies the service device, receive incoming traffic associated with the session, and provide, based on the particular information that identifies the service device, incoming traffic, associated with the session, to the service device for application of the network service to the incoming traffic, the incoming traffic and the outgoing traffic being provided to the service device.

16. The system of claim 15, where the subscriber gateway is further to:

provide, to the network gateway, a session identifier associated with the session of the subscriber device, the session identifier being provided to allow the network gateway to identify an association between the session and the service device.

17. The system of claim 15, where the subscriber gateway is further to:

identify, based on the network service to be applied to traffic associated with the session of the subscriber device, a set of service devices configured to apply the network service, the multiple service devices including the set of service devices, and where, when performing the dynamic load balancing, the subscriber gateway is to:

perform the dynamic load balancing, based on the set of service devices, to identify the service device, the service device being one or more service devices in the set of service devices configured to apply the network service.

18. The system of claim 15, where the RADIUS message is associated with authentication, authorization, and accounting management services.

19. The system of claim 15, where the particular information is represented by an attribute-value pair included in the RADIUS message.

20. The system of claim 15, where the network service includes at least one of:
- a firewall service,
- a parental control service,
- a packet inspection service,
- a content optimization service,
- a content cache service, or
- a traffic detection service.

\* \* \* \* \*